United States Patent Office 3,539,650
Patented Nov. 10, 1970

3,539,650
PRODUCTION OF m-XYLENE
Emanuel M. Amir, deceased, late of Baytown, Tex., by Mary E. Amir, heiress, Howell, Mich., assignor to Esso Research and Engineering Company
No Drawing. Filed Apr. 30, 1969, Ser. No. 821,171
Int. Cl. C07c 7/02, 15/08
U.S. Cl. 260—674       13 Claims

ABSTRACT OF THE DISCLOSURE

Purified m-xylene is obtained by alkylating a mixture containing m- and p-xylene with a small but effective amount of isopropylating agent in the presence of a small but sufficient amount of aluminum chloride catalyst, the alkylation mixture being maintained at a temperature within the range of about 70° to about 100° C. for about thirty minutes to one hour after which the catalyst is destroyed, an isopropyl m-xylene fraction recovered, and the recovered fraction deisopropylated to produce m-xylene above 95% purity.

BACKGROUND OF THE INVENTION

Field of the invention

The present invention is directed to the production of m-xylene. More particularly, the invention is concerned with the recovery of m-xylene from its mixtures with p-xylene. In its more specific aspects, the invention is concerned with the production of m-xylene by selective alkylation of m-xylene in admixture with p-xylene and recovery of m-xylene from the alkylated product.

Description of the prior art

It is known to alkylate a mixture of m- and p-xylene using aluminum chloride as a catalyst. However, when this reaction is carried out under conventional conditions, the product contains isopropyl p-xylene as well as 4-isopropyl and 5-isopropyl m-xylene. When this product is distilled to recover an isopropyl m-xylene fraction and the isopropyl m-xylene fraction is deisopropylated, m-xylene is obtained at conversions of 50% to 75% of only about 91–94% purity. At lower conversions, it is possible to produce higher purity m-xylene, but this is at a sacrifice in conversion. In accordance with the present invention, m-xylene purities of above 95% are obtainable which may be as high as 96% to 97% at 50% conversions.

SUMMARY OF THE INVENTION

The present invention may be briefly described and summarized as involving the production and purification of m-xylene from its mixtures with its isomers. Ethylbenzene and o-xylene are removed by fractional distillation and the resultant m- and p-xylene mixture is then alkylated under alkylating conditions in the presence of an aluminum chloride catalyst employing an isopropylating agent which is preferably propylene. Under selected conditions which include a heat soaking period during which the alkylation mixture is maintained at a selected temperature for a selected period of time, isopropyl m-xylenes are formed which are recovered and then subjected to dealkylation which may involve transalkylation with another aromatic hydrocarbon or subjection to heating over a suitable dealkylation catalyst to form m-xylene of a purity over 95%.

DESCRIPTION OF THE PREFERRED MODES AND EMBODIMENTS

The mixed xylenes stream available from usual refinery operations contains ethylbenzene, p-xylene, m-xylene, and o-xylene. Of these, the first and the last can be separated by fractional distillation. Because of the closeness of the boiling points of p- and m-xylenes, this type of separation is not possible for these isomers. This invention describes a novel process where such a separation is accomplished by a combination of chemical and physical means.

The present invention involves the selective formation of the isopropyl derivatives of m-xylene in its mixtures with p-xylene by novel alkylation steps, separating the isopropyl m-xylene and then recovering the m-xylene by dealkylation.

The features of the alkylation steps are:
(1) Alkylation of the mixed m-/p-xylene at temperatures preferably 70°–90° C.
(2) The alkylation should not proceed to complete conversion, preferably about 50% conversion.
(3) The reaction mivture following alkylation is heat soaked at a suitable temperature for about one half to about one hour before the catalyst is destroyed.

The feed for the process is an m-/p-xylene mixture prepared by fractional distillation of the xylene fraction to remove substantially all the ethylbenzene and o-xylene.

When this mixture is isopropylated by the usual means, a mixture of three isomeric products are produced. These compounds and their boiling points are given in Table I.

TABLE I

The isopropyl m- and p-xylenes

|  | B.P., ° C. |
|---|---|
| Isopropyl p-xylene | 196.2 |
| 4-isopropyl m-xylene | 199.1 |
| 5-isopropyl m-xylene | 194.5 |

It is not possible to separate the isopropyl m-xylenes from the isopropyl p-xylenes by distillation. Examples of carrying out the invention as compared to the prior art are given below.

The feed consisted of an m-xylene concentrate having the typical composition given in Table II.

TABLE II

Feed composition

|  | Wt. percent |
|---|---|
| Ethylbenzene | 0.6 |
| p-Xylene | 13 |
| m-Xylene | 86 |
| o-Xylene | 0.4 |

Other feeds may be used, of course, and feed stocks containing lesser and greater quantities of p- and m-xylene may be employed. For example, the p-xylene concentration may be as high as the equilibrium value but may range from 5% to about 15% by weight while the m-xylene concentration may range from 85% to about 90.0% by weight. The alkylation was conducted by adding 1 wt. percent aluminum chloride to the feed of Table II, heating to reaction temperature and bubbling propylene into the reaction mixture until the desired conversion was reached. The results are given in Table III.

TABLE III

| | Alkylation temperature | | | | | | | |
|---|---|---|---|---|---|---|---|---|
| | 55° C. | | 70° C. | | 80° C. | | 90° C. | |
| Conversion, percent | 50 | 25 | 50 | 75 | 25 | 50 | 75 | 50 |
| Products: | | | | | | | | |
| 5-isopropyl m-xylene | 57.8 | 76.6 | 78.0 | 78.7 | 82.4 | 81.2 | 81.8 | 80.3 |
| 4-isopropyl m-xylene | 32.8 | 16.2 | 14.2 | 12.9 | 11.9 | 12.8 | 10.4 | 13.7 |
| Isopropyl p-xylene | 9.4 | 7.2 | 7.8 | 8.4 | 5.7 | 6.0 | 7.8 | 6.0 |
| Purity of m-xylene obtainable | 90.6 | 92.8 | 92.2 | 91.6 | 95.3 | 94.0 | 92.2 | 94.0 |

The "Purity of m-Xylene Obtainable" given in Table III is achieved when the total alkylation products are deisopropylated. It will be clear that only in one instance at 80° C. and 25% conversion was the purity of the m-xylene above 95%.

If the reaction mixture, after propylene addition but before the catalyst is destroyed, is heated in accordance with the present invention at the reaction temperature for an additional ½–1 hour, the composition of the recovered m-xylene changes as shown in Table IV.

TABLE IV

| | Temperature | | | | | | | |
|---|---|---|---|---|---|---|---|---|
| | 55° C. | | 70° C. | | 80° C. | | 90° C. | |
| Conversion, percent | 50 | 25 | 50 | 75 | 25 | 50 | 75 | 50 |
| Products after heating: | | | | | | | | |
| 5-isopropyl m-xylene | 81.1 | 90.4 | 88.9 | 86.4 | 90.5 | 87.4 | 96.6 | 88.8 |
| 4-isopropyl m-xylene | 10.3 | 6.9 | 7.2 | 7.3 | 6.9 | 8.3 | 7.1 | 7.2 |
| Isopropyl p-xylene | 8.6 | 2.7 | 3.9 | 6.3 | 2.6 | 4.4 | 6.3 | 4.0 |
| Purity of m-xylene obtainable | 91.4 | 97.3 | 96.1 | 93.7 | 97.4 | 95.6 | 93.7 | 96.0 |

It is evident that the additional heating time and using conversions less than 75% results in alkylation products containing more than 95% m-xylene derivatives. These alkylated products are then deisopropylated to give a xylene product containing more than 95% m-xylene.

A feature of the present invention is that distillation is not required to separate the isopropylated m- and p-xylenes since the alkylation as shown is selective to the isopropyl m-xylenes. Any unreacted p-xylene is removed by distillation of the alkylated product prior to deisopropylation, however.

The deisopropylation is accomplished by well-known means such as by transalkylation with another aromatic hydrocarbon such as benzene and the like to give cumene and m-xylene. When deisopropylation is accomplished by transalkylation, distillation is employed to remove any unreacted benzene and cumene. Deisopropylation may also be accomplished by passing the vaporized isopropyl m-xylene fraction over a non-acidic solid dealkylation catalyst such as platinum or palladium on alumina at a temperature of about 450° C. but which may range from 425° C. to 500° C. in the presence or absence of hydrogen where the isopropyl group is removed as propylene. Other solid dealkylation catalysts such as the noble metal catalysts supported on charcoal may be used. The contact time of the isopropyl m-xylene with the dealkylation catalyst should be carefully controlled within the range of about 0.5 to 5.0 v./v./hr. to avoid undesirable side reactions, and pressures should be controlled within the range of 15 to 300 p.s.i.g. to avoid hydrogenation reactions.

The transalkylation method is illustrated in the following example: A 296 g. (2 mole) fraction of isopropyl m-xylenes prepared by alkylation of an m-/p-xylene fraction to 50% conversion at 80° C. and heat soaking at 80° C. for one hour was mixed with 468 g. (6 moles) benzene and the mixture heated to 80° C. Aluminum chloride, 7 g., was added and heating resumed for one hour. The catalyst was then decomposed with diluted caustic solution, the hydrocarbon phase dried and fractionally distilled.

After the unreacted benzene was removed, regenerated xylene fraction was recovered. This amounted to about 190 g. (90% conversion). Analysis showed it to be about 95.2% m-xylene. Cumene was next recovered by distillation. This fraction amounted to about 205 g. (85% recovery). A residue consisted of some unreacted isopropylxylenes and some diisopropylbenzenes which in a continuous type operation may be recycled for complete reaction.

VARIABLES OF THE INVENTION

The alkylation temperature may suitably range from about 60° to about 100° C. with a preferred range of about 70° C. to about 90° C. A temperature of about 70° to about 80° C. gives high purities of m-xylene. The alkylation is suitably conducted for a time within the range of 15 to about 45 minutes. The heat soaking operation is conducted in the presence of the catalyst for about ½ to about 1 hour at the alkylation temperature.

The amount of aluminum chloride may range from about 0.5 to about 2.0% by weight of the feed mixture. An amount of about 1% by weight gives desirable results.

The aluminum chloride catalyst may be suitably destroyed by using an aqueous alkali metal hydroxide solution such as sodium, potassium or lithium hydroxide containing about 5 to about 25% weight of alkali metal hydroxide. An aqueous solution containing from about 5 to about 10% by weight of NaOH is preferred.

The isopropylating agent may be propylene, isopropyl alcohol, or an isopropyl halide such as isopropyl chloride, which is preferred among the halides, isopropyl bromide, and isopropyl iodide. Propylene is the preferred alkylating agent.

The amount of the isopropylating agent is suitably less than 0.75 mole per mol of feed, and an amount of isopropylating agent within the range of about 0.25 to about 0.75 mole per mole of feed mixture can be used. An amount of about 0.5 mole is preferred.

Purified m-xylene is a very valuable and useful product, the uses of which are well known. For example, it is useful as a solvent or as a feed stock in oxidation reactions to produce isophthalic acid.

The nature and objects of the present invention having been completely described and illustrated and the best mode contemplated set forth, what is claimed as new and useful is:

1. A method for separating m-xylene from its mixtures with p-xylene which comprises:
   alkylating a mixture of m- and p-xylene with an isopropylating agent in the presence of a small but sufficient amount of anhydrous aluminum chloride catalyst;
   the isopropylating agent being an effective amount less than 0.75 mol per mol of said mixture;

maintaining said alkylation mixture at a temperature within the range of about 60° to about 100° C.;

for a time within the range between about 30 minutes and 1 hour to form a product containing isopropyl m-xylene;

treating said product to destroy said catalyst;

recovering from said treated product an isopropyl m-xylene fraction; and deisopropylating said isopropyl m-xylenes fraction to form an m-xylene fraction containing at least 95% m-xylene.

2. A method in accordance with claim 1 in which the isopropylating agent is propylene.

3. A method in accordance with claim 1 in which the isopropylating agent is an isopropyl halide.

4. A method in accordance with claim 3 in which the isopropyl halide is isopropyl chloride.

5. A method in accordance with claim 1 in which the isopropylating agent is isopropyl alcohol.

6. A method in accordance with claim 1 in which the product is treated with dilute alkali metal hydroxide solution to destroy the catalyst.

7. A method in accordance with claim 1 in which the isopropyl m-xylene fraction is recovered by distillation.

8. A method in accordance with claim 1 in which the isopropyl m-xylene fraction is deisopropylated by transalkylation with benzene.

9. A method in accordance with claim 1 in which:
(a) the isopropyl m-xylene fraction is recovered by distillation; and
(b) the isopropyl m-xylene fraction is deisopropylated by transalkylation with benzene.

10. A method in accordance with claim 9 in which:
(a) the isopropylating agent is propylene;
(b) the product is treated with dilute alkali metal hydroxide solution to destroy the catalyst;
(c) the amount of aluminum chloride catalyst is about 0.5 to about 2% by weight of the mixture; and
(d) the alkylation temperature is within the range of about 70° to about 90° C.

11. A method in accordance with claim 1 in which the deisopropylation is by passage of the isopropyl m-xylene in a vaporized condition over a solid non-acidic dealkylation catalyst at a temperature of about 425° to about 500° C.

12. A method in accordance with claim 11 in which the dealkylation catalyst is platinum or alumina and a pressure within the range of 15 to 300 p.s.i.g. is used.

13. A method in accordance with claim 7 in which the isopropyl m-xylene fraction and unreacted p-xylene are recovered by distillation.

References Cited

UNITED STATES PATENTS

| | | | |
|---|---|---|---|
| 2,648,713 | 8/1953 | Schneider | 260—674 |
| 2,816,940 | 12/1957 | Schlatter | 260—674 |
| 2,840,621 | 6/1958 | Corson et al. | 260—671 X |
| 3,418,389 | 12/1968 | Amir | 260—674 |

DELBERT E. GANTZ, Primary Examiner

C. R. DAVIS, Assistant Examiner

U.S. Cl. X.R.

260—671, 672